US008981584B2

(12) United States Patent
Banham-Hall et al.

(10) Patent No.: US 8,981,584 B2
(45) Date of Patent: Mar. 17, 2015

(54) GENERATOR TORQUE CONTROL METHODS

(75) Inventors: Dominic David Banham-Hall, Northampton (GB); Gareth Anthony Taylor, London (GB); Christopher Alan Smith, Leicester (GB)

(73) Assignee: GE Energy Power Conversion Technology Ltd., Warwickshire (GB)

(*) Notice: Subject to any disclaimer, the term of this patent is extended or adjusted under 35 U.S.C. 154(b) by 84 days.

(21) Appl. No.: 13/808,148

(22) PCT Filed: Jul. 6, 2011

(86) PCT No.: PCT/EP2011/003346
§ 371 (c)(1),
(2), (4) Date: Feb. 26, 2013

(87) PCT Pub. No.: WO2012/003970
PCT Pub. Date: Jan. 12, 2012

(65) Prior Publication Data
US 2013/0207394 A1    Aug. 15, 2013

(30) Foreign Application Priority Data

Jul. 6, 2010    (EP) .................................... 10006961

(51) Int. Cl.
| | |
|---|---|
| F03D 9/00 | (2006.01) |
| H02P 9/04 | (2006.01) |
| F03D 7/02 | (2006.01) |
| H02P 9/00 | (2006.01) |
| H02P 9/48 | (2006.01) |
| H02K 7/18 | (2006.01) |

(52) U.S. Cl.
CPC ............... *H02P 9/04* (2013.01); *F03D 7/0224* (2013.01); *F03D 9/003* (2013.01); *H02P 9/006* (2013.01); *H02P 9/48* (2013.01); *H02K 7/1838* (2013.01); *Y02E 10/723* (2013.01); *Y02E 10/725* (2013.01)
USPC .......................................................... 290/44

(58) Field of Classification Search
CPC ............. H02P 9/04; H02P 9/006; H02P 9/48; H02P 2009/004; F03D 7/0224; F03D 9/003; H02K 7/1838; Y02E 10/723; Y02E 10/725; B60L 7/22
USPC ......................................... 290/44, 43, 55, 54
See application file for complete search history.

(56) References Cited

U.S. PATENT DOCUMENTS

| | | | |
|---|---|---|---|
| 4,316,722 A | * | 2/1982 | Aschauer ........................ 440/74 |
| 8,067,845 B2 | * | 11/2011 | Thulke et al. ................... 290/44 |
| 2007/0216164 A1 | | 9/2007 | Rivas |

FOREIGN PATENT DOCUMENTS

| | | |
|---|---|---|
| DE | 101 05 892 A1 | 9/2002 |
| DE | 10 2006 060323 A1 | 6/2008 |

* cited by examiner

*Primary Examiner* — Javaid Nasri
(74) *Attorney, Agent, or Firm* — Parks Wood LLC (57) ABSTRACT

A wind turbine typically includes a generator and a rotating mechanical system having a natural period. The present invention relates to a method of controlling generator torque that minimizes oscillations in the speed of the generator rotor. In the event of a grid fault or transient, or a fault in the power converter, the generator torque is decreased at a substantially constant rate with respect to time. The rate at which the generator torque is decreases is proportional to the nominal rated torque of the generator and inversely proportional to an integer multiple of the natural period of the rotating mechanical system.

13 Claims, 6 Drawing Sheets

PRIOR ART

GENERATOR TORQUE CONTROL METHODS

FIELD OF THE INVENTION

The present invention relates to generator torque control methods, and in particular to methods for controlling torque in the generator of a wind turbine during a fault condition.

BACKGROUND OF THE INVENTION

It is possible to convert wind energy to electrical energy by using a wind turbine to drive the rotor of a generator, either directly or by means of a gearbox. The ac frequency that is developed at the stator terminals of the generator (the "stator voltage") is directly proportional to the speed of rotation of the rotor. The voltage at the generator terminals also varies as a function of speed and, depending on the particular type of generator, on the flux level. For optimum energy capture, the speed of rotation of the output shaft of the wind turbine will vary according to the speed of the wind driving the turbine blades. To limit the energy capture at high wind speeds, the speed of rotation of the output shaft is controlled by altering the pitch of the turbine blades. Matching of the variable voltage and frequency of the generator to the nominally fixed voltage and frequency of the supply network can be achieved by using a power converter.

Figure 1:
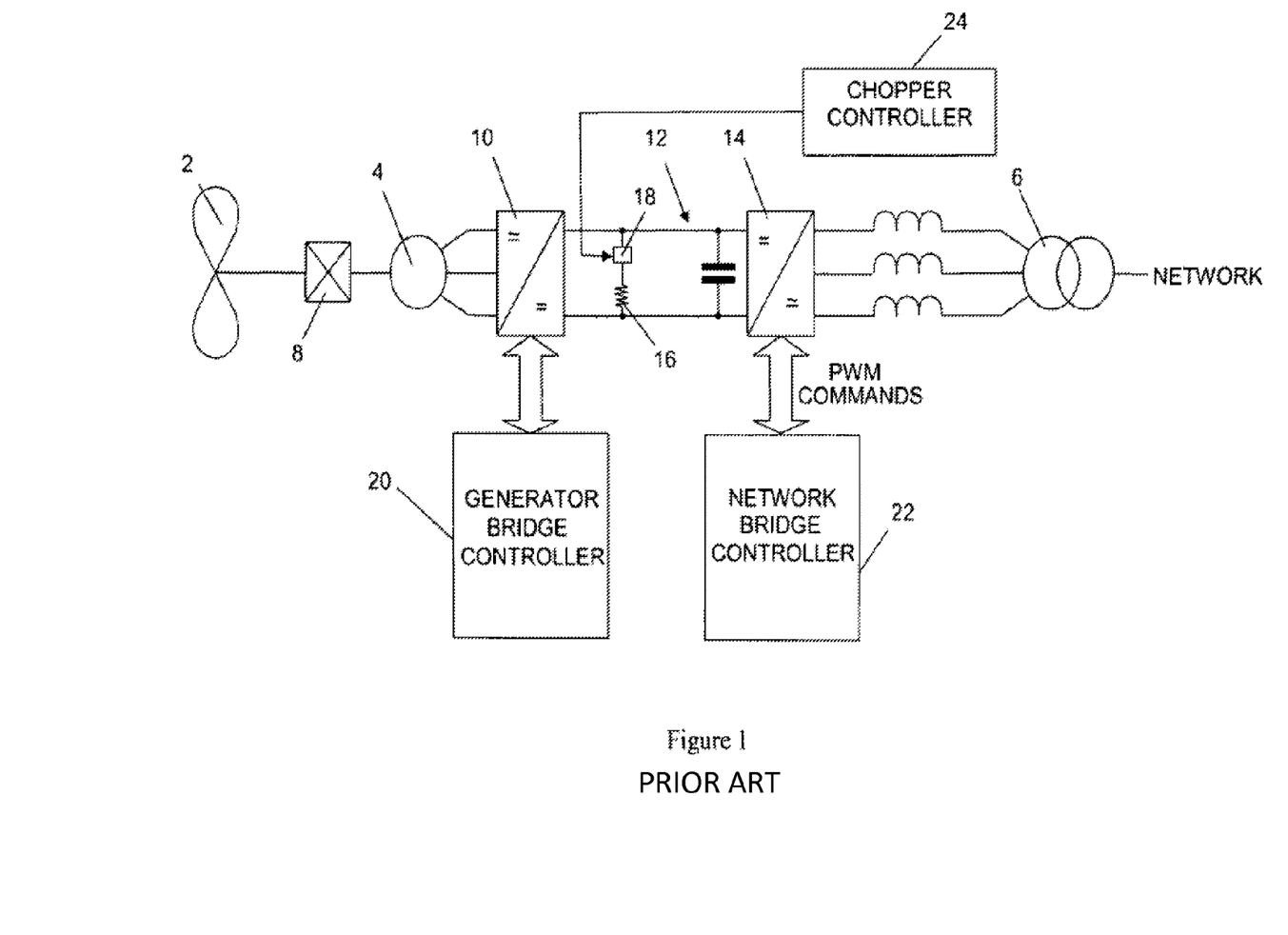
FIG. 1 is a typical schematic drawing of a wind turbine and power converter arrangement.

A typical wind turbine and power converter assembly is shown in FIG. 1. The power converter is used to interface between the wind turbine 2 driving a variable speed ac generator 4 and a supply network (labelled NETWORK). The wind turbine typically includes three turbine blades mounted on a rotating shaft and whose pitch can be controlled by means of a pitch actuator. A gearbox 8 is used to connect the rotating shaft to the rotor of the generator 4. In some cases, the rotating shaft can be connected directly to the generator rotor.

The terminals of the generator 4 are connected to the ac terminals of a three-phase generator bridge 10 which in normal operation operates as an active rectifier to supply power to a dc link 12. The generator bridge 10 has a conventional three-phase two-level topology with a series of semiconductor power switching devices fully controlled and regulated using a pulse width modulation (PWM) strategy. However, in practice the generator bridge 10 can have any suitable topology such as a three-level neutral point clamped topology or a multi-level topology (Foch-Maynard arrangement, for example).

The dc output voltage of the generator bridge 10 is fed to the dc terminals of a network bridge 14 which in normal operation operates as an inverter. The network bridge 14 has a similar three-phase two-level topology to the generator bridge 10 with a series of semiconductor power switching devices fully controlled and regulated using a PWM strategy. However, in practice the network bridge 14 can have any suitable topology, as discussed above for the generator bridge 10.

The generator bridge 10 is controlled by a generator bridge controller 20 and the network bridge 14 is controlled by a network bridge controller 22. Physically the control system may reside within the same hardware and be only a separation within software.

The ac output voltage of the network bridge 14 is filtered by a network filter before being supplied to the supply network via a step-up transformer 6. Protective switchgear (not shown) can be included to provide a reliable connection to the supply network and to isolate the generator system from the supply network for various operational and non-operational requirements.

Sudden changes in generator torque can cause serious mechanical oscillations in the drive train of the wind turbine. Such changes can occur during a grid fault where the inability to export power into the supply network results in a near simultaneous step reduction in generator torque, or as a result of a fault in the power converter. The magnitude of the mechanical oscillations is directly proportional to the magnitude of the step reduction in generator torque. In some cases the turbine assembly and drive train can be physically designed and engineered to withstand these mechanical oscillations without the need for any further protection. However, the mechanical oscillations can be kept within acceptable limits by allowing at least some of the power that cannot be exported into the supply network to be absorbed in a dynamic braking resistor (DBR) 16 that is connected in series with a suitable actuator 18 or switchgear (e.g. a semiconductor switching device such as a FET or IGBT which is sometimes referred to as a "chopper") across the dc link 12. When the dc link voltage rises above a limit in response to a fault condition then the actuator 18 is controlled by a chopper controller 24 to short-circuit the dc link 12 so that the power that is exported from the generator 4 is absorbed by the DBR 16. The energy that is absorbed by the DBR 16 as a result of the fault condition is the integral of the absorbed power and is dissipated as heat. The DBR 16 can have any suitable physical construction and can be air- or water-cooled, for example.

If the DBR 16 is partially rated then only part of the generator power is absorbed by the DBR. In this situation the generator torque will still undergo a step reduction but it will be of a lower magnitude when compared to an arrangement where no DBR is provided. The magnitude of the mechanical oscillations in the drive train will therefore be correspondingly reduced. If the DBR 16 is fully rated then all of the generator power is absorbed by the DBR until such time as the generator 4 can start to export power into the supply network. Conventionally this may mean that the DBR 16 is rated to accept all of the generator power for a second a more. If the DBR 16 is fully rated then the generator torque will not undergo a step reduction and there is nothing to excite the mechanical oscillations in the drive train.

Figure 2A:
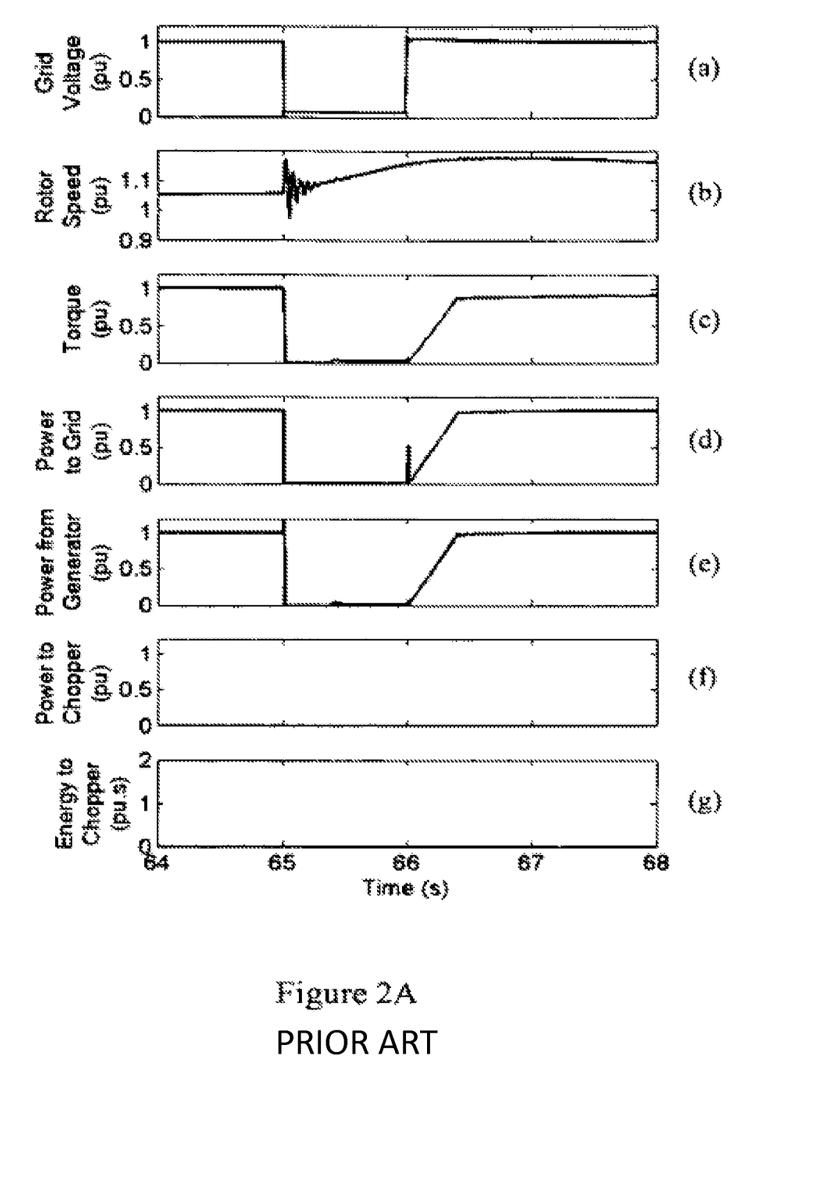
FIGS. 2A and 2B are a series of graphs (a) to (g) showing how operational parameters of the wind turbine and power converter assembly of FIG. 1 vary in certain situations.
Figure 2B:
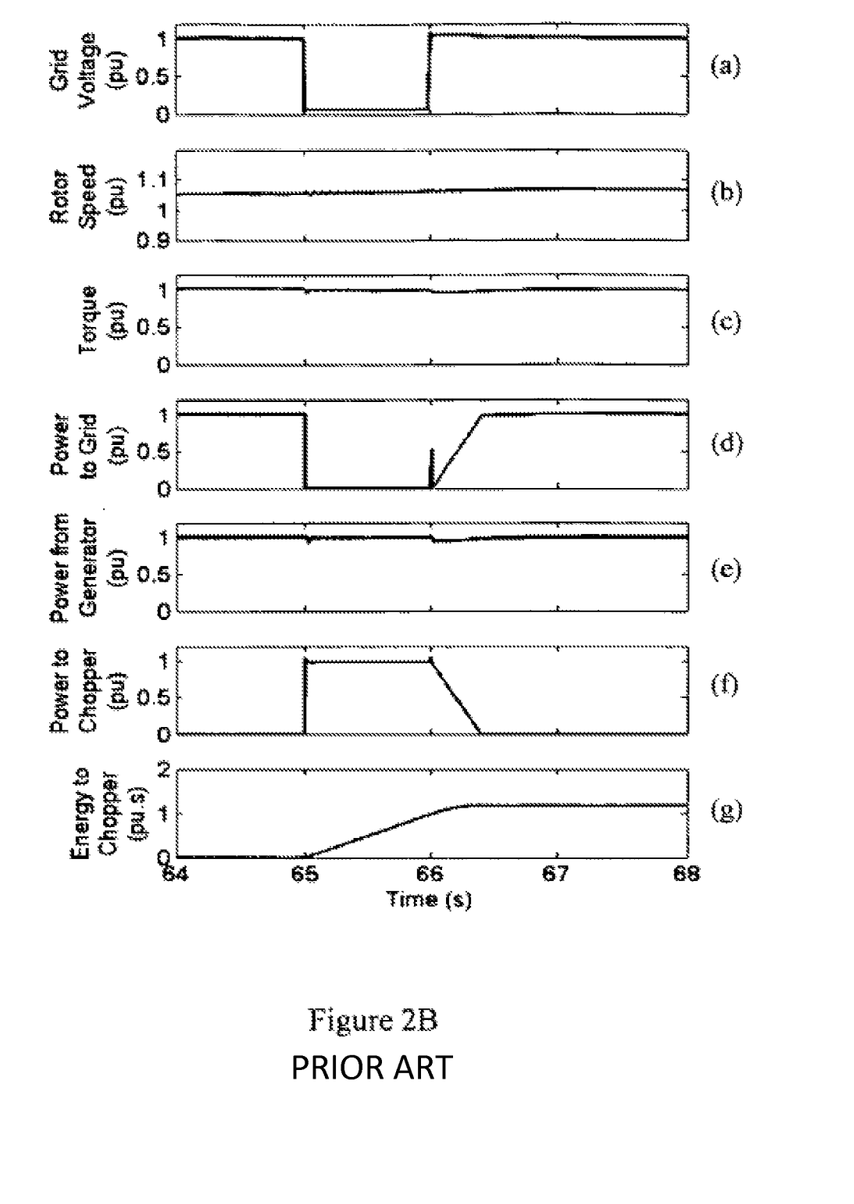

The difference in the generator torque response for an arrangement where there is no DBR and an arrangement where a fully rated DBR 16 is provided across the dc link 12 is shown in FIGS. 2A and 2B. Each Figure includes a series of seven graphs labelled (a) to (g) which show how the following operational parameters of the wind turbine and power converter assembly of FIG. 1 vary in a pu or "per unit" system during a grid fault where the grid voltage in the supply network dips to zero for one second:

Graph (a)—grid voltage (or supply voltage)
Graph (b)—speed of the generator rotor
Graph (c)—generator torque
Graph (d)—the amount of power that is exported to the supply network through the network bridge 14
Graph (e)—the amount of power that is exported from the generator 4 to the dc link 12 through the generator bridge 10
Graph (f)—the amount of generator power that is absorbed by the DBR 16
Graph (g)—the amount of energy that is absorbed by the DBR 16

It can be seen from graphs (a) of FIGS. 2A and 2B that the grid voltage undergoes a step reduction from 1 to 0 at time t=65 s, remains at 0 for one second and recovers with a step increase from 0 to 1 at time t=66 s. Grid codes typically require the wind turbine to remain connected to the supply network during grid faults or transients. In other words, the wind turbine and power converter assembly must normally have some capacity for grid fault or low voltage ride-through. During such grid faults or transients the generator is unable to export power to the supply network. Graphs (d) of FIGS. 2A and 2B therefore show that the power that is exported to the supply network undergoes a step reduction from 1 to 0 at time t=65 s, remains at 0 for one second and, after a small surge at time t=66 s, starts to increase at a constant rate at time t=66 s once the grid voltage has recovered.

In the arrangement where there is no DBR then graph (c) of FIG. 2A shows that the generator torque undergoes a step reduction from 1 to 0 at time t=65 s, remains at 0 for one second and starts to increase at a constant rate at time t=66 s once the grid voltage has recovered. Graph (b) of FIG. 2A shows how the step reduction in generator torque at time t=65 s causes significant oscillations in the speed of the generator rotor. The inability to export power to the supply network during the grid fault also causes the speed of the generator rotor to increase to a peak speed at about time t=66.5 s before starting to gradually decrease.

Graph (e) of FIG. 2A shows that the amount of power that is exported from the generator to the dc link also undergoes a step reduction from 1 to 0 at time t=65 s, remains at 0 for one second and starts to increase at a constant rate at time t=66 s once the grid voltage has recovered.

In the arrangement where the actuator 18 is controlled at time t=65 s to short-circuit the dc link 12 so that the power that is exported from the generator 4 into the dc link through the generator bridge 10 is absorbed by the fully rated DBR 16 then graph (f) of FIG. 2B shows that the power that is absorbed by the DBR undergoes a step increase at time t= 65 s. All of the generator power is absorbed by the DBR 16 until time t=66 s when the grid voltage has recovered and power can once again be exported to the supply network. At time t=66 s the power that is absorbed by the DBR 16 starts to decrease at a constant rate. Graph (g) shows the total amount of energy that is absorbed by the DBR 16. It will be readily appreciated that energy is the integral of the absorbed power shown in graph (f). Energy is absorbed at a constant rate between times t=65 s and t=66 s since the DBR 16 absorbs all of the generator power for the full duration of the grid fault. The rate at which energy is absorbed starts to reduce at time t=66 s as the power that is absorbed by the DBR 16 starts to decrease at a constant rate and graph (g) eventually shows a constant value at about t=66.4 s which represents the total amount of energy that has been absorbed by the DBR as a result of the grid fault.

Because all of the generator power is absorbed by the DBR 16 during the grid fault, the generator torque and the amount of power that is exported from the generator 4 remain substantially constant. There are no significant oscillations in the speed of the generator rotor and no gradual increase in the speed either. The use of a fully rated DBR therefore provides useful protection and avoids the problems that occur when the generator torque is allowed to undergo a step reduction. Although the graphs for a partially rated DBR are not shown, it will be readily appreciated that they will show a variation in the operational parameters of the wind turbine and power converter assembly that is somewhere between those shown FIGS. 2A and 2B. In other words, the generator torque will undergo a step reduction but the magnitude of the step reduction and the magnitude of the resulting oscillations in the speed of the generator rotor will depend on the partial rating of the DBR as compared to a nominal full rating.

SUMMARY OF THE INVENTION

The present invention provides an improved method of controlling generator torque during a fault condition (e.g. a grid fault or transient where the supply network experiences a voltage dip, or a fault in the power converter that is connected to the generator of the wind turbine assembly). More particularly, in a wind turbine comprising a generator and a rotating mechanical system having a natural period Tn, the method of controlling generator torque includes the step of decreasing the generator torque during a fault condition at a substantially constant rate with respect to time t according to the equation:

$$\text{generator torque}(t) = \left(\frac{\text{rated\_torque}}{n \cdot Tn}\right)t + c \qquad (EQ1)$$

where:
rated_torque is the nominal rated torque of the generator,
n is an integer, and
c is a constant (which can optionally be zero).

The nominal rated torque of the generator will normally be defined as the generator torque at the rated output power and with generator speed equal to the nominal rated speed, i.e.:

$$\text{rated\_torque} = \left(\frac{\text{rated\_power}}{\text{rated\_speed}}\right)$$

If the generator torque is decreased in this manner then the absolute magnitude of any mechanical oscillations in the rotating mechanical system can be significantly reduced to zero or substantially zero.

In a vector control system then the generator torque can be reduced by imposing suitable ramp rate limits on the real current controller that forms part of the controller for the generator bridge, for example. The ramp rate limits can be applied to a torque reference and/or a torque axis current reference.

The rotating mechanical system of the wind turbine may include a turbine assembly having at least one turbine blade (three would be typical), a rotor assembly of the generator, and any associated drive shaft(s). In the case of a non-direct drive wind turbine then the rotating mechanical system may further include a gearbox that is provided between the turbine assembly and the rotor assembly of the generator. The rotating mechanical system may therefore be considered in terms of a two-mass, spring and damper system where the turbine assembly is separated from the rotor assembly of the generator by at least one shaft (and optional gearbox) of finite stiffness and damping. The natural period Tn for any particular rotating mechanical system can be determined or calculated from parameters such as shaft stiffness, damping, blade inertia and generator inertia.

The pitch of the at least one turbine blade may be altered or adjusted under the control of a pitch actuator. The method may therefore further include the step of altering the pitch of the at least one turbine blade to minimise peak generator speed during a fault condition. In other words, the pitch of the at least one turbine blade may be altered so that the turbine assembly captures less wind and any increase in the speed of rotation of the output shaft (and hence the rotor assembly of the generator) as a result of the fault condition is minimised. The pitch of the at least one turbine blade can be varied as soon as a fault condition is detected or at any other time.

The generator torque can be made to decrease as soon as a fault condition is detected. Alternatively, the generator torque can be maintained substantially constant (e.g. at the nominal rated torque of the generator or at the torque of the generator immediately prior to the onset of the fault condition) for a period of time before it is made to decrease. In particular the generator torque can be maintained substantially constant for a predetermined period of time while the pitch of the at least one turbine blade is altered or adjusted by the pitch actuator.

Typically the generator is connected to a power converter which interfaces the generator to a supply network or power grid. The power converter can have any suitable topology but in one arrangement includes a generator bridge connected to a network bridge by a dc link. A dynamic braking resistor (DBR) can be connected in series with an actuator or switchgear across the dc link. The rating of the DBR and the associated actuator or switchgear can be significantly reduced if the generator torque is made to decrease at a substantially constant rate as described above. This is because power flow into the DBR can be rapidly reduced, thereby ensuring that the total amount of energy that is absorbed by the DBR as a result of the fault condition is minimised. The DBR can have a smaller rating than would be the case for a conventional wind turbine and power converter assembly where the generator power is absorbed for the full duration of the fault condition. This means that the DBR can be made physically smaller and the cooling requirements are significantly reduced leading to cost savings.

The method is of particular importance to wind turbines having permanent magnet generators (PMGs) where the peak generator speed is critical to the voltage rating of the power converter and where transients due to mechanical oscillations in the rotating mechanical system or drive train may exceed those that result from the acceleration of the turbine assembly. PMGs typically have direct drive arrangements or low gear ratios and so the natural period of their rotating mechanical systems is often lower than for other types of wind turbines.

The present invention further provides a wind turbine comprising: a generator; a rotating mechanical system having a natural period Tn, the rotating mechanical system including a turbine assembly having at least one turbine blade, a rotor assembly of the generator and any associated drive shaft(s); and a power converter; wherein the power converter is controlled to decrease the generator torque during a fault condition at a substantially constant rate with respect to time t according to EQ1.

The turbine assembly can include a pitch actuator that is controlled to alter the pitch of the at least one turbine blade to minimise peak generator peak speed during a fault condition. The power converter can have any suitable topology but in one arrangement includes a generator bridge that is controlled by a generator bridge controller to decrease the generator torque during a fault condition at a substantially constant rate by imposing ramp rate limits on a torque reference and/or a torque axis current reference that is used by the generator bridge controller.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIEMENTS

Figure 2C:
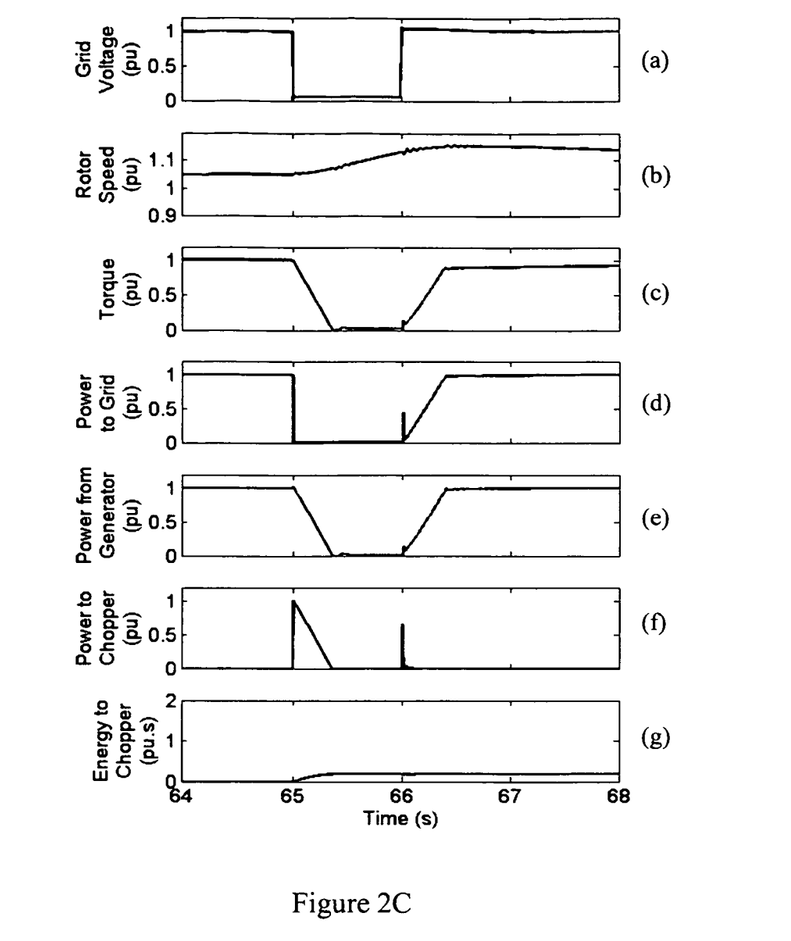
FIG. 2C is a series of graphs (a) to (g) showing how operational parameters vary in a situation where the generator torque is made to decrease as soon as the grid fault is detected with reference to a method according to the present invention.
Figure 2D:
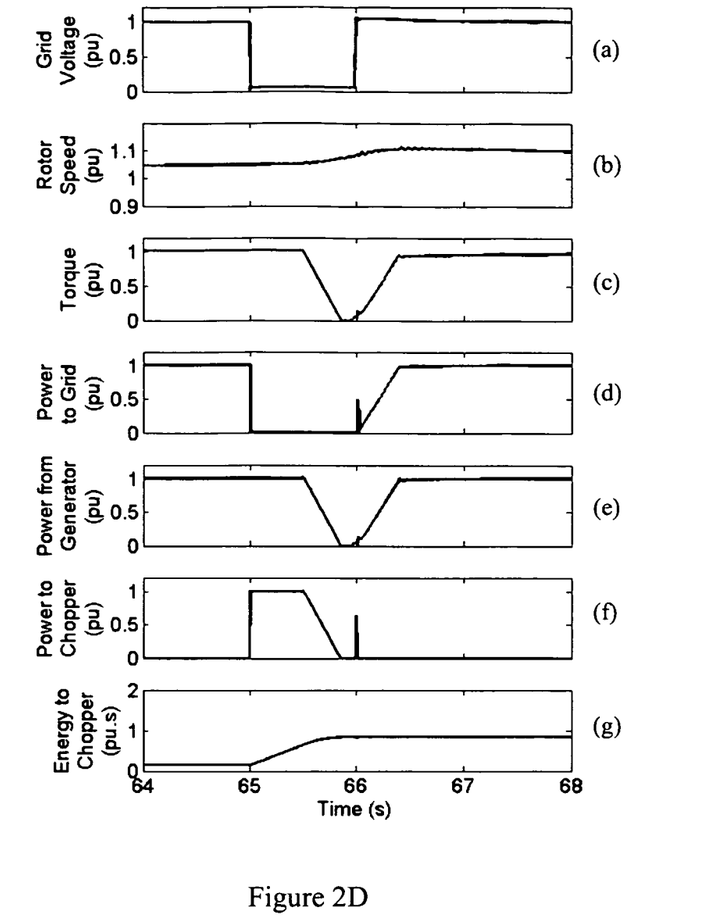
FIG. 2D is a series of graphs (a) to (g) showing how operational parameters vary in a situation where the generator torque is held substantially constant for 0.5 seconds before it is made to decrease with reference to a method according to the present invention.

The generator torque control method of the present invention is best understood with reference to FIGS. 2C and 2D. Each Figure includes a series of seven graphs labelled (a) to (g) as described above and which show how the operational parameters of the wind turbine and power converter assembly of FIG. 1 vary in a pu or "per unit" system during a grid fault where the grid voltage in the supply network dips to zero for one second. FIG. 2C shows how the operational parameters vary in a situation where the generator torque is made to decrease as soon as the grid fault is detected. FIG. 2D shows how the same operational parameters vary in a situation where the generator torque is held substantially constant for 0.5 s before it is made to decrease.

It can be seen from graphs (a) of FIGS. 2C and 2D that the grid voltage undergoes a step reduction from 1 to 0 at time t=65 s, remains at 0 for one second and recovers with a step increase from 0 to 1 at time t=66 s. For the reasons discussed above, graphs (d) of FIGS. 2C and 2D show that the power that is exported to the supply network therefore undergoes a step reduction from 1 to 0 at time t=65 s, remains at 0 for one second and, after a small surge at time t=66 s, starts to increase at a constant rate at time t=66 s once the grid voltage has recovered.

In both situations, the actuator 18 is controlled at time t=65 s to short-circuit the dc link 12 so that the generator power is absorbed by the DBR 16.

Graph (c) of FIG. 2C shows that the generator torque starts to decrease at a constant rate at time t=65 s, remains at 0 and starts to increase at a constant rate at time t=66 s once the grid voltage has recovered. The constant rate at which the generator torque is reduced is determined by equation EQ1 and is related to the nominal rated torque of the generator 4 and the natural period Tn of the rotating mechanical system of the wind turbine which includes the turbine assembly, the generator rotor and associated drive shafts. Graph (b) of FIG. 2C shows how the speed of the generator rotor increases to a peak speed at about time t=66.5 s before starting to gradually decrease. Because of the torque reduction (or ramp down), there are no significant oscillations in the rotor speed.

Graph (e) of FIG. 2C shows that the amount of power that is exported from the generator 4 to the dc link 12 starts to decrease at a constant rate at time t=65 s in line with the decrease in the generator torque, remains at 0 and starts to increase at a constant rate at time t=66 s once the grid voltage has recovered.

Graph (f) of FIG. 2C shows that the power that is absorbed by the DBR undergoes a step increase at time t=65 s. All of the generator power is absorbed by the DBR 16 until time t=66 s when the grid voltage has recovered and power can once again be exported to the supply network. However, it will be readily appreciated that unlike the situation shown in FIG. 2B where the generator power remains substantially constant during the grid fault because there is no decrease in generator torque, in this case the amount of power that is exported from the generator 4 to the dc link 12 starts to decrease at a constant rate at time t=65 s and reaches 0 at about time t=65.4 s. This means that from time t=65 s there is a decreasing amount of generator power for the DBR 16 to absorb, and no generator power to absorb at all from time t=65.4.

Graph (g) of FIG. 2C shows the total amount of energy that is absorbed by the DBR 16 as a result of the grid fault. The constant value which represents the total amount of energy that has been absorbed by the DBR 16 is considerably less than that shown in graph (g) of FIG. 2B where the fully rated DBR absorbs all of the generator power for the full duration of the grid fault.

Graph (c) of FIG. 2D shows that the generator torque is held substantially constant for 0.5 s after the grid fault has been detected and only starts to decrease at a constant rate at time t=65.5 s. This might allow time for the pitch of the turbine blades to be varied by a pitch actuator to minimise the peak generator speed, for example. The generator torque remains at 0 and starts to increase at a constant rate at time t=66 s once the grid voltage has recovered. The constant rate at which the generator torque is reduced is determined by equation EQ1 and is related to the nominal rated torque of the generator 4 and the natural period Tn of the rotating mechanical system of the wind turbine which includes the turbine assembly, the generator rotor and associated drive shafts. The rate at which the generator torque is reduced is the same for the alternative situations shown in FIGS. 2C and 2D since the rate is dependant on physical parameters of the particular wind turbine system and not on when the generator torque starts to decrease during a fault condition. Graph (b) of FIG. 2D shows how the speed of the generator rotor increases to a peak speed at about time t=66.5 s before starting to gradually decrease. Because of the torque reduction, there are no significant oscillations in the rotor speed.

Graph (e) of FIG. 2D shows that the amount of power that is exported from the generator 4 to the dc link 12 remains at the rated output power for 0.5 s after the grid fault has been detected and only starts to decrease at a constant rate at time t=65.5 s in line with the decrease in the generator torque. The generator power remains at 0 and starts to increase at a constant rate at time t=66 s once the grid voltage has recovered.

Graph (f) of FIG. 2D shows that the power that is absorbed by the DBR undergoes a step increase at time t=65 s. All of the generator power is absorbed by the DBR 16 until time t=66 s when the grid voltage has recovered and power can once again be exported to the supply network. However, it will be readily appreciated that unlike the situation shown in FIG. 2B where the generator power remains substantially constant during the grid fault because there is no decrease in generator torque, in this case the amount of power that is exported from the generator 4 to the dc link 12 starts to decrease at a constant rate at time t=65.5 s and reaches 0 at about time t=69.4 s. This means that from time t=65.5 s there is a decreasing amount of generator power for the DBR 16 to absorb, and no generator power to absorb at all from time t=65.9 s.

Graph (g) of FIG. 2D shows the total amount of energy that is absorbed by the DBR 16 as a result of the grid fault. The constant value which represents the total amount of energy that has been absorbed by the DBR 16 is considerably less than the total amount shown in graph (g) of FIG. 2B where the fully rated DBR absorbs all of the generator power for the full duration of the grid fault. However, the constant value shown in graph (g) of FIG. 2D is more than the total amount shown in graph (g) of FIG. 2C where the generator torque is made to decrease as soon as the grid fault is detected.

Figure 3:
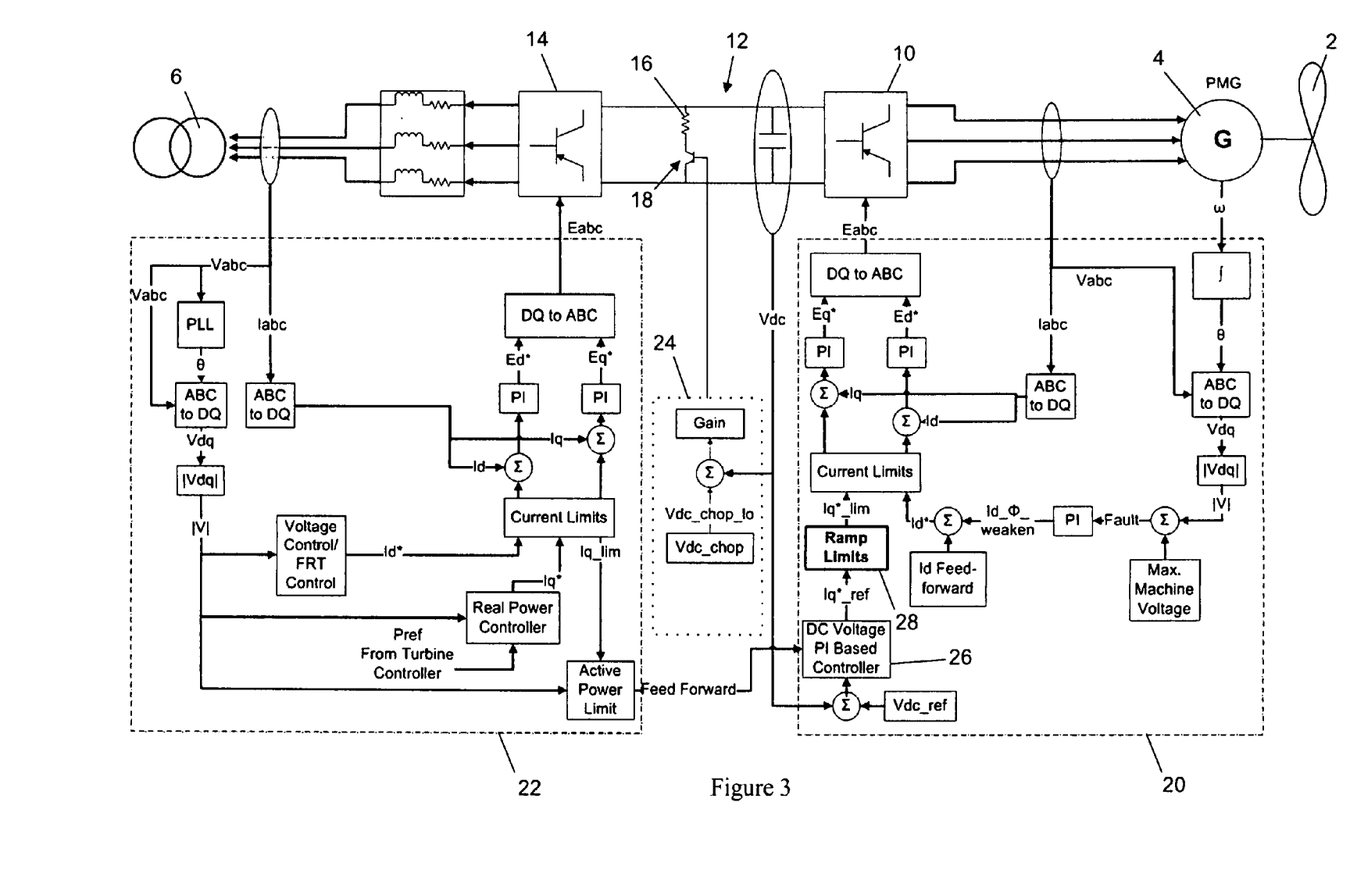
FIG. 3 is a schematic control diagram for a control method of a wind turbine and power converter arrangement according to the present invention.

FIG. 3 shows a schematic control diagram for the wind turbine and power converter assembly of FIG. 1. The generator 4 is a permanent magnet generator (PMG). The series of semiconductor power switching devices of the generator bridge 10 are fully controlled and regulated using a pulse width modulation (PWM) strategy by the generator bridge controller 20. The generator bridge controller 20 uses vector control where, in this example, torque control takes place on the q axis. A voltage reference signal Vdc_ref indicative of a desired dc link voltage is compared to a voltage feedback signal Vdc that is a measurement of the dc link voltage. A dc voltage PI based controller 26 uses the comparison of the voltage reference signal Vdc_ref and the voltage feedback signal Vdc to provide a torque axis (or q axis) current reference signal Iq*_ref. A function block 28 imposes a suitable ramp rate limit on the torque axis current reference signal Iq*_ref and provides a limited torque axis current signal Iq*_lim that is then used by the generator bridge controller 20 to derive firing commands Eabc for the semiconductor power switching devices of the generator bridge 10 to achieve a desired generator torque. During a grid fault or transient then the ramp rate limits imposed by the function block 28 on the current reference signal Iq*_ref will not allow the generator torque to undergo a step change and instead cause the generator torque to decrease at a constant rate (i.e. to ramp down) according to equation EQ1 mentioned above. The ramp rate limits may be imposed as soon as the grid fault is detected or after a predetermined time delay during which the generator torque is held at the same torque as immediately prior to the onset of the grid fault.

The importance of the ramp rate limits can be seen by considering the case without them. Prior to a grid fault or power converter fault the generator 4 will export power into the dc link 12 through the generator bridge 10. To balance the dc link voltage, power is exported through the network bridge 14 to the supply network. Either the generator bridge 10 or the network bridge 14 may have responsibility for maintaining the dc link voltage at the desired level. During a grid fault or power converter fault, the power that can be exported to the supply network will decrease and cause the dc link voltage to increase. If the generator bridge 10 has responsibility for controlling the dc link voltage then the generator bridge controller 20 will rapidly decrease the torque axis current reference signal Iq*_ref in order to reduce the dc link voltage. Alternatively, the torque reference of the generator bridge may be rapidly decreased by a feedforward signal that is provided by the network bridge controller 22. Under either method, the torque axis current reference signal Iq*_ref will therefore experience a torque change that approaches a step change as shown in graph (c) of FIG. 2A. In the present invention the ramp rate limits are applied to limit the rate at which the torque axis current reference signal Iq*_ref can be decreased and cause the generator torque to decrease at a constant rate according to equation EQ1 mentioned above.

Although the specific description has concentrated on a grid fault situation, it will be readily appreciated that the ramp rate limits can also be imposed on the torque axis current reference signal Iq*_ref in the event of a fault in the power converter.

The control diagram of FIG. 3 is for illustrative purposes only and it will be readily appreciated that generator torque can be controlled using other torque reference and/or torque axis current reference control systems.

The invention claimed is:

1. In a wind turbine comprising a generator and a rotating mechanical system having a natural period Tn determined based on parameters of the rotating mechanical system, a method of controlling generator torque includes decreasing the generator torque during a fault condition at constant rate with respect to time t according to the equation:

$$\text{generator torque}(t) = \left(\frac{\text{rated\_torque}}{n \cdot Tn}\right)t + c$$

where: rated_ torque is the nominal rated torque of the generator,
n is an integer,
"•" represents multiplication of the integer and the natural period Tn of the rotating mechanical system, and
c is the constant rate.

2. The method of claim 1, wherein the wind turbine further comprises a turbine assembly having at least one turbine blade, the method further including altering a pitch of at least one turbine blade to minimize peak generator speed during, a fault condition.

3. The method of claim 2, wherein the pitch of the at least one turbine blade is altered as soon as the fault condition is detected.

4. The method of claim 2, further including maintaining generator torque substantially constant for a period of time during a fault condition before decreasing the torque at the constant rate.

5. The method according of claim 4, wherein the generator torque is maintained substantially constant while the pitch of the at least one turbine blade is altered.

6. The method of claim 1, wherein the torque is decreased at the constant rate as soon as the fault condition is detected.

7. The method of claim 1, wherein the wind turbine further comprises a generator bridge that is controlled by a generator bridge controller, the method further comprising the step of decreasing the torque at a substantially constant rate by imposing ramp rate limits on a torque reference and/or a torque axis current reference that is used by the generator bridge controller.

8. The method of claim 1, wherein the parameters comprise at least one of shaft stiffness, damping, blade inertia and generator inertia of the rotating mechanical system.

9. A wind turbine comprising:
a generator;
a rotating mechanical system having a natural period Tn which is determined based on parameters of the rotating mechanical system, the rotating mechanical system including a turbine assembly having at least one turbine blade, a rotor assembly of the generator and any associated drive shaft(s); and
a power converter;
wherein the power converter is controlled to decrease generator torque during a fault condition at a constant rate with respect to time t according to the equation:

$$\text{generator torque}(t) = \left(\frac{\text{rated\_torque}}{n \cdot Tn}\right)t + c$$

where:
rated_ torque is the nominal rated torque of the generator,
n is an integer,
"•" represents multiplication of the integer and the natural period Tn of the rotating mechanical system, and
c is the constant rate.

10. The wind turbine of claim 9, wherein the power converter comprises a generator bridge that is controlled by a generator bridge controller to decrease the generator torque during a fault condition at the constant rate by imposing ramp rate limits on a torque reference and/or a torque axis current reference that is used by the generator bridge controller.

11. The wind turbine of claim 9, wherein the turbine assembly further includes a pitch actuator that is controlled to alter the pitch of the at least one turbine blade to minimize peak generator peak speed during a fault condition.

12. The wind turbine of claim 9, wherein the parameters comprise at least one of shaft stiffness, damping, blade inertia and generator inertia of the rotating mechanical system.

13. A method of controlling generator torque in a wind turbine including a generator and a rotating mechanical system having a natural period Tn determined based on parameters of the rotating mechanical system, the method comprising:
decreasing the generator torque during a fault condition at a constant rate c with respect to time t as a function of:
rated torque being a nominal rated torque of the generator,
n being an integer, and
the constant rate c.

* * * * *